(12) United States Patent
Isozaki

(10) Patent No.: US 11,615,100 B2
(45) Date of Patent: Mar. 28, 2023

(54) INFORMATION PROCESSING APPARATUS, INFORMATION PROCESSING METHOD, AND COMPUTER PROGRAM

(71) Applicant: Sony Corporation, Tokyo (JP)

(72) Inventor: Takashi Isozaki, Kanagawa (JP)

(73) Assignee: Sony Corporation, Tokyo (JP)

(*) Notice: Subject to any disclaimer, the term of this patent is extended or adjusted under 35 U.S.C. 154(b) by 34 days.

(21) Appl. No.: 17/254,208

(22) PCT Filed: Jun. 18, 2019

(86) PCT No.: PCT/JP2019/024159
§ 371 (c)(1),
(2) Date: Dec. 18, 2020

(87) PCT Pub. No.: WO2020/004154
PCT Pub. Date: Jan. 2, 2020

(65) Prior Publication Data
US 2021/0124740 A1    Apr. 29, 2021

(30) Foreign Application Priority Data
Jun. 28, 2018 (JP) .............. JP2018-123392

(51) Int. Cl.
*G06F 16/22* (2019.01)
*G06F 16/2458* (2019.01)
*G06N 7/00* (2023.01)

(52) U.S. Cl.
CPC ...... *G06F 16/2462* (2019.01); *G06F 16/2282* (2019.01); *G06N 7/005* (2013.01)

(58) Field of Classification Search
None
See application file for complete search history.

(56) References Cited

U.S. PATENT DOCUMENTS

| | | | |
|---|---|---|---|
| 2003/0022152 A1* | 1/2003 | Campbell | ............ C12Q 1/025 435/7.1 |
| 2008/0108881 A1* | 5/2008 | Stupp | .................. G16H 10/20 600/300 |

(Continued)

FOREIGN PATENT DOCUMENTS

| | | | | |
|---|---|---|---|---|
| EP | 3570227 A1 | * | 11/2019 | ......... G06F 3/04847 |
| JP | 2005-107747 A | | 4/2005 | |

(Continued)

OTHER PUBLICATIONS

International Search Report and English translation thereof dated Aug. 20, 2019 in connection with International Application No. PCT/JP2019/024159.

(Continued)

*Primary Examiner* — Wilson Lee
(74) *Attorney, Agent, or Firm* — Wolf, Greenfield & Sacks, P.C.

(57) ABSTRACT

Provided is a mechanism capable of easily grasping or analyzing the relation between three or more variables. An information processing apparatus (100) includes a control unit (130) that accepts the designation of a variable of interest among multiple variables including three or more variables with respect to data including values of the multiple variables, and outputs first information indicating the (Continued)

strength of the relation between the variable of interest and the combinations of explanatory variables including two or more explanatory variables among the multiple variables.

18 Claims, 5 Drawing Sheets

(56) References Cited

U.S. PATENT DOCUMENTS

| | | | | |
|---|---|---|---|---|
| 2009/0018975 | A1* | 1/2009 | Geltner | G06Q 40/00 |
| | | | | 705/400 |
| 2012/0331024 | A1* | 12/2012 | Aoki | G06F 17/18 |
| | | | | 708/200 |
| 2013/0297549 | A1* | 11/2013 | Yano | G08B 19/00 |
| | | | | 706/46 |
| 2013/0304567 | A1* | 11/2013 | Adrien | G06Q 30/0243 |
| | | | | 705/14.42 |
| 2014/0289174 | A1* | 9/2014 | Statnikov | G06N 5/04 |
| | | | | 706/12 |
| 2014/0336788 | A1* | 11/2014 | Paunonen | G05B 13/04 |
| | | | | 700/29 |
| 2015/0095334 | A1 | 4/2015 | Tsuji et al. | |
| 2015/0178827 | A1* | 6/2015 | Qiu | G06Q 40/02 |
| | | | | 705/35 |
| 2016/0232539 | A1* | 8/2016 | Morinaga | G06Q 30/02 |
| 2017/0221240 | A1* | 8/2017 | Stetson | G06F 40/137 |
| 2018/0158158 | A1* | 6/2018 | Coogan-Pushner | G06Q 40/00 |
| 2019/0332957 | A1* | 10/2019 | Malur Srinivasan | G06N 7/005 |

FOREIGN PATENT DOCUMENTS

| | | |
|---|---|---|
| JP | 2005-122509 A | 5/2005 |
| JP | 2012-027880 A | 2/2012 |
| JP | 2015-060259 A | 3/2015 |

OTHER PUBLICATIONS

Changhe Yuan et al: "Most Relevant Explanation: computational complexity and approximation methods", Annals of Mathematics and Artificial Intelligence, Kluwer Academic Publishers, Do, vol. 61, No. 3, Nov. 18, 2011 (Nov. 18, 2011), pp. 159-183, XP019985754, ISSN: 1573-7470, DOI: 10.1007 / S10472-011-9260-Z *the whole document*.

Clifford Champion et al: "Visualizing the Consequences of Evidence in Bayesian Networks", Jul. 3, 2017 (Jul. 3, 2017), pp. 1-9, XP055589820, Retrieved from the Internet: URL: https://arxiv.org/ftp/arxiv/papers/1707/1707.00791.pdf [retrieved on May 17, 2019] *the whole document*.

Yuan Changhe et al: "A General Framework for Generating Multivariate Explanations in Bayesian Networks". Jan. 1, 2008 (Jan. 1, 2008). pp. 1-6, XP05582554, Retrieved from the Internet: URL: https://www.aaai.org/Papers/AAAI/2008/AAAI08-177.pdf [retrieved on Jul. 19, 2021] *the whole document*.

\* cited by examiner

INFORMATION PROCESSING APPARATUS, INFORMATION PROCESSING METHOD, AND COMPUTER PROGRAM

CROSS-REFERENCE TO RELATED APPLICATIONS

This application claims the benefit under 35 U.S.C. § 371 as a U.S. National Stage Entry of International Application No. PCT/JP2019/024159, filed in the Japanese Patent Office as a Receiving Office on Jun. 18, 2019, which claims priority to Japanese Patent Application Number JP2018-123392, filed in the Japanese Patent Office on Jun. 28, 2018, each of which is hereby incorporated by reference in its entirety.

FIELD

The present disclosure relates to an information processing apparatus, an information processing method, and a computer program.

BACKGROUND

In recent years, there has been a demand for improvement in a data analysis technology for extracting useful information from data such as big data. Analysis results are used for understanding phenomena that have already occurred, and predicting, controlling, or intervening the future.

One of the basic items in the analysis of multiple-variable data is to estimate a relation such as a correlation between two variables. The estimated relation between two variables or multiple variables is frequently expressed as a graphical model (hereinafter, also referred to as a graph) because of the readability of the analysis results of the multiple-variable data.

For example, the following Non-Patent Literatures 1 and 2 and Patent Literature 1 disclose technologies for estimating a cause-effect relation between multiple variables on the basis of multiple-variable data and expressing the relation as a graph.

CITATION LIST

Non-Patent Literature

Non Patent Literature 1: P. Spirtes, C. Glymour, R. Scheiness, "Causation, Prediction, and search", MIT Press, second edition, 2000

Non Patent Literature 2: J. Pearl, "Probabilistic Reasoning in Intelligent System", Morgan Kaufmann, 1988

Non Patent Literature 3: E. Castillo, J. M. Gutierrez, and A. S. Hadi, Expert System and Probabilistic Network Models, Springer, 1997

Non-Patent Literature 4: J. Pearl, "Causality", Cambridge University Press, second edition, 2009

Patent Literature

Patent Literature 1: Japanese Laid-open Patent Publication No. 2014-228991

SUMMARY

Technical Problem

There are various examples of expressing relations in a graph. For example, in a railway network, stations can be expressed as nodes and lines can be expressed as sides (edges), and numerical values, such as a distance between two stations in which sides are connected, a required time, or fare, are allocated to the sides. Similarly to this, also in a neural network, weights (numerical values) indicating the relation between two nodes can be allocated to sides, so that also in a network-shaped graph representing correlation or causality, it is easily considered to allocate to sides between nodes representing variables, the strength of the relation between two variables, such as a correlation coefficient corresponding to a weight or the amount of mutual information, and actually, this is expressed in many cases. However, in the technologies disclosed in Non-Patent Literatures 1 and 2 and Patent Literature 1, although graph information and information on the strength of the relation between two variables are estimated, it is not possible to easily know the strength of a quantitative relation between multiple variables with only these pieces of information.

Consequently, in the correlation or cause-effect relation, cases where the relation between three or more variables is important are often found, but there is a problem in that these are difficult to be expressed by the above expression method. On the other hand, quantitatively examining the relation between multiple variables by examining a joint probability distribution or a conditional probability distribution of the multiple variables is possible by the examination of the conditional probability distribution as disclosed in Non-Patent Literature 4. However, since many methods for combining three or more variables may exist, when it is not clear which combination is important, there is a problem that it takes a lot of effort to thoroughly examine the relation between the multiple variables.

In this regard, the present disclosure provides a mechanism capable of easily grasping or analyzing the relation between three or more variables.

Solution to Problem

In accordance with the present disclosure, an information processing apparatus comprising a control unit that accepts a designation of a variable of interest among multiple variables including three or more variables with respect to data including values of the multiple variables, and outputs first information indicating a strength of a relation between the variable of interest and combinations of explanatory variables including two or more explanatory variables among the multiple variables is provided.

Furthermore, in accordance with the present disclosure, an information processing method performed by a processor, the information processing method comprising accepting a designation of a variable of interest among multiple variables including three or more variables with respect to data including values of the multiple variables; and outputting first information indicating a strength of a relation between the variable of interest and combinations of explanatory variables including two or more explanatory variables among the multiple variables is provided.

Moreover, in accordance with the present disclosure, a computer program causing a computer to serve as a control unit that accepts a designation of a variable of interest among multiple variables including three or more variables with respect to data including values of the multiple variables, and outputs first information indicating a strength of a relation between the variable of interest and combinations of explanatory variables including two or more explanatory variables among the multiple variables is provided.

Advantageous Effects of Invention

According to the present disclosure, it is possible to provide a mechanism capable of easily grasping or analyzing the relation between three or more variables. Note that the aforementioned effects are not always restrictive, and in addition to or in place of the aforementioned effects, any of effects described in the present specification or other effects that can be understood from the present specification may be obtained.

DESCRIPTION OF EMBODIMENTS

Figure 1:
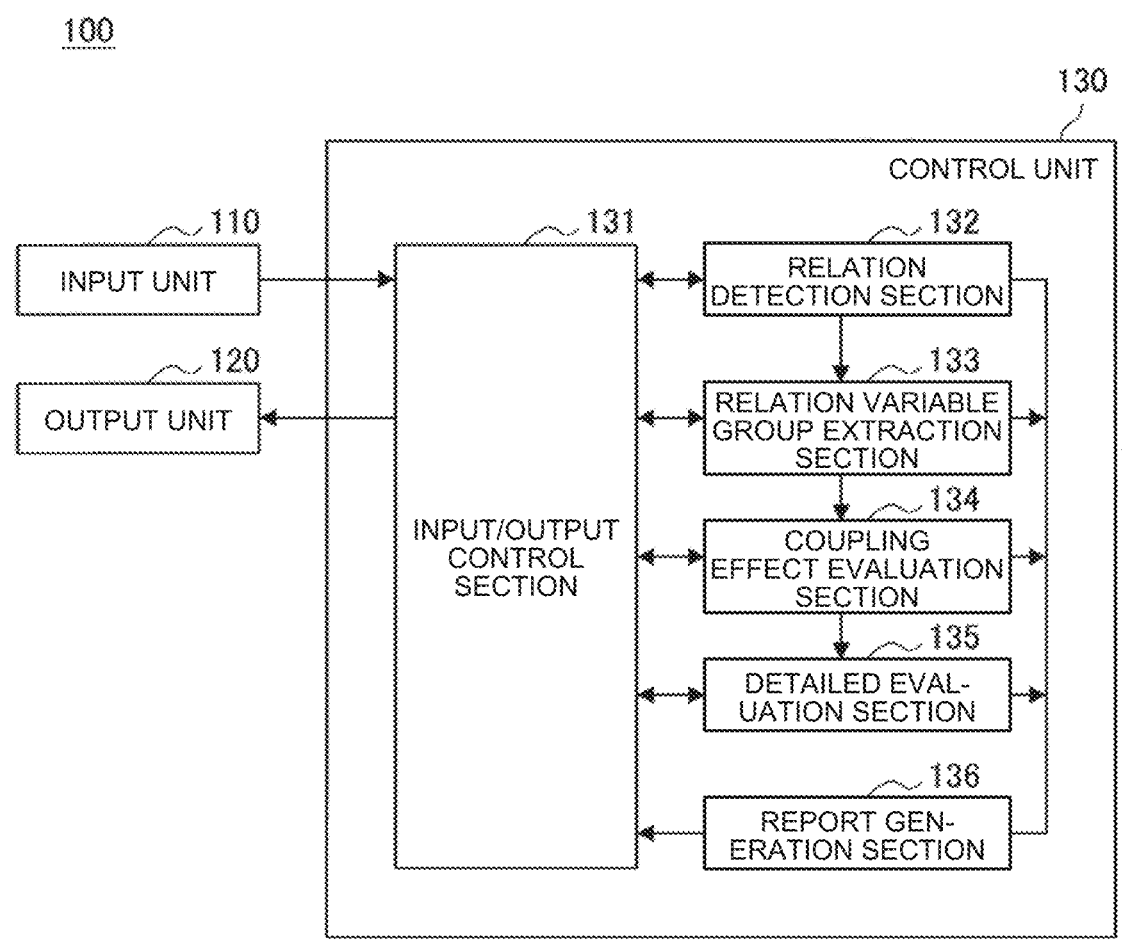
FIG. 1 is a block diagram illustrating one example of a logical configuration of an information processing apparatus according to one embodiment of the present disclosure.

Hereinafter, preferred embodiments of the present disclosure will be described in detail with reference to the accompanying drawings. Note that in the present specification and the drawings, components having substantially the same functional configurations are denoted by the same reference numerals and a redundant description thereof will be omitted.

Note that the description will be given in the following order.

1. Overview of proposed technology
2. Configuration example
3. Processing flow
4. Application examples
5. Hardware configuration example
6. Summary <<1. Overview of Proposed Technology>>

One of the basic items in the analysis of multiple-variable data is to first examine the relation (correlation or cause-effect relation) between two variables. The relation between two variables can be expressed by a graph including nodes indicating variables and links connecting related variables. In such a graph, information indicating a relation such as correlation coefficients can be displayed in correlation with the links. By such a graph, it is possible to improve the readability of the relation between two variables, in particular.

However, no attempts have been made to improve the readability of the relation between multiple variables of three or more variables, particularly in terms of which multivariable relation is important. This is because an index for evaluating the relation between multiple variables of three or more variables has not been specifically discussed. Moreover, there have been few indexes in terms of how much amount of information will increase after an evaluation object is expanded to three or more variables when the relation between two variables is already known. Furthermore, no user interface (UI) for allowing a user to easily obtain these pieces of information has been provided.

The correlation or cause-effect relation may also exist not only between two variables but also in combinations of multiple variables of three or more variable. For example, a plurality of explanatory variables may have an influence on one variable of interest, which is different from an influence of the explanatory variable alone. The variable of interest is a variable targeted as an analysis object. Hereinafter, such a variable of interest is also referred to as a target variable. Such an effect is also referred to as a coupling effect. If it becomes possible to evaluate the relation between multiple variables of three or more variables, it becomes possible to efficiently analyze the coupling effect.

In this regard, the present disclosure provides a mechanism capable of easily grasping or analyzing the relation between three or more variables in relation to analysis of multiple-variable data.

<<2. Configuration Example>>

FIG. 1 is a block diagram illustrating one example of a logical configuration of an information processing apparatus 100 according to one embodiment of the present disclosure. As illustrated in FIG. 1, the information processing apparatus 100 according to the present embodiment includes an input unit 110, an output unit 120, and a control unit 130.

(1) Input unit 110

The input unit 110 has a function of accepting the input of various information. The input unit 110 outputs the received information to the control unit 130.

The input unit 110 accepts the input of multiple-variable data to be analyzed. The multiple-variable data is data including values of multiple variables including three or more variables.

The input unit 110 accepts various inputs for analysis. For example, the input unit 110 accepts inputs such as the designation of a target variable, the designation of an explanatory variable, the number n of explanatory variables included in the combinations of explanatory variables to be described later, the number m of selections to be described later, and the input of a threshold value Th and the like to be described later. The input unit 110 may include an optional input device such as a touchscreen, a keyboard, or a mouse, and accepts the input of these pieces of information by a user operation on such an input device.

(2) Output unit 120

The output unit 120 has a function of outputting various information. The output unit 120 outputs various information under the control of the control unit 130. The output unit 120 may include a display device, and output a UI screen indicating an analysis result, for example. The output unit 120 may include a voice output device, and output voice for prompting a user's voice input, for example. The output unit 120 may include a communication device conforming to any communication standard, and output information indicating the analysis result to another information processing apparatus or storage device, for example. The output unit 120 may include a printing device and print a report indicating the analysis result, for example.

(2) control unit 130

The control unit 130 has a function of controlling the entire operation of the information processing apparatus 100. As illustrated in FIG. 1, the control unit 130 includes an input/output control section 131, a relation detection section 132, a relation variable group extraction section 133, a coupling effect evaluation section 134, a detailed evaluation section 135, and a report generation section 136. The control unit 130 may include components other than these components.

Input/Output Control Section 131

The input/output control section 131 is an interface with the input unit 110, the output unit 120, and the other components included in the control unit 130 (the relation detection section 132, the relation variable group extraction section 133, the coupling effect evaluation section 134, the detailed evaluation section 135, and the report generation section 136). The input/output control section 131 outputs the information input by the input unit 110 to other components corresponding to the information, and allows the output unit 120 to output information output from the other components. For example, the input/output control section 131 outputs multiple-variable data input by the input unit 110 to the relation detection section 132. Furthermore, the input/output control section 131 generates a UI screen indicating an analysis result, allows the output unit 120 to output the UI screen, and outputs to another component corresponding to the user operation, information indicating a user operation on the UI screen that is input by the input unit 110.

Relation Detection Section 132

The relation detection section 132 has a function of detecting the relation between two variables.

Specifically, the relation detection section 132 calculates third information that is an index of the relation between two variables, on the basis of the multiple-variable data input by the input unit 110. Then, the relation detection section 132 detects the relation between two variables on the basis of the third information. Hereinafter, the third information is also referred to as the index of the relation between two variables.

The relation may be a correlation. In such a case, the index of the relation between two variables is, for example, statistics indicating the correlation.

Examples of such statistics include a correlation coefficient. The relation detection section 132 detects the presence or absence and the strength of the correlation between two variables on the basis of the statistics indicating the correlation.

The relation may be a cause-effect relation. In such a case, the index of the relation between two variables is, for example, statistics indicating the cause-effect relation. The relation detection section 132 detects the presence or absence and the strength of the cause-effect relation between two variables by an independent component analysis method, a method of using an estimation result, as a score, by a maximum likelihood method with penalties or the Bayesian method and maximizing the estimation result, an estimation method using a statistical test of conditional independence between variables, or the like.

The relation detection section 132 outputs information indicating the detected relation between two variables to the input/output control section 131. The input/output control section 131 generates a UI screen including a graph that expresses the relation between multiple variables, on the basis of the information indicating the relation between two variables, and allows the output unit 120 to output the UI screen. For example, the input/output control section 131 generates a UI screen 10 illustrated in FIG. 2 and allows the output unit 120 to output the UI screen 10.

Figure 2:
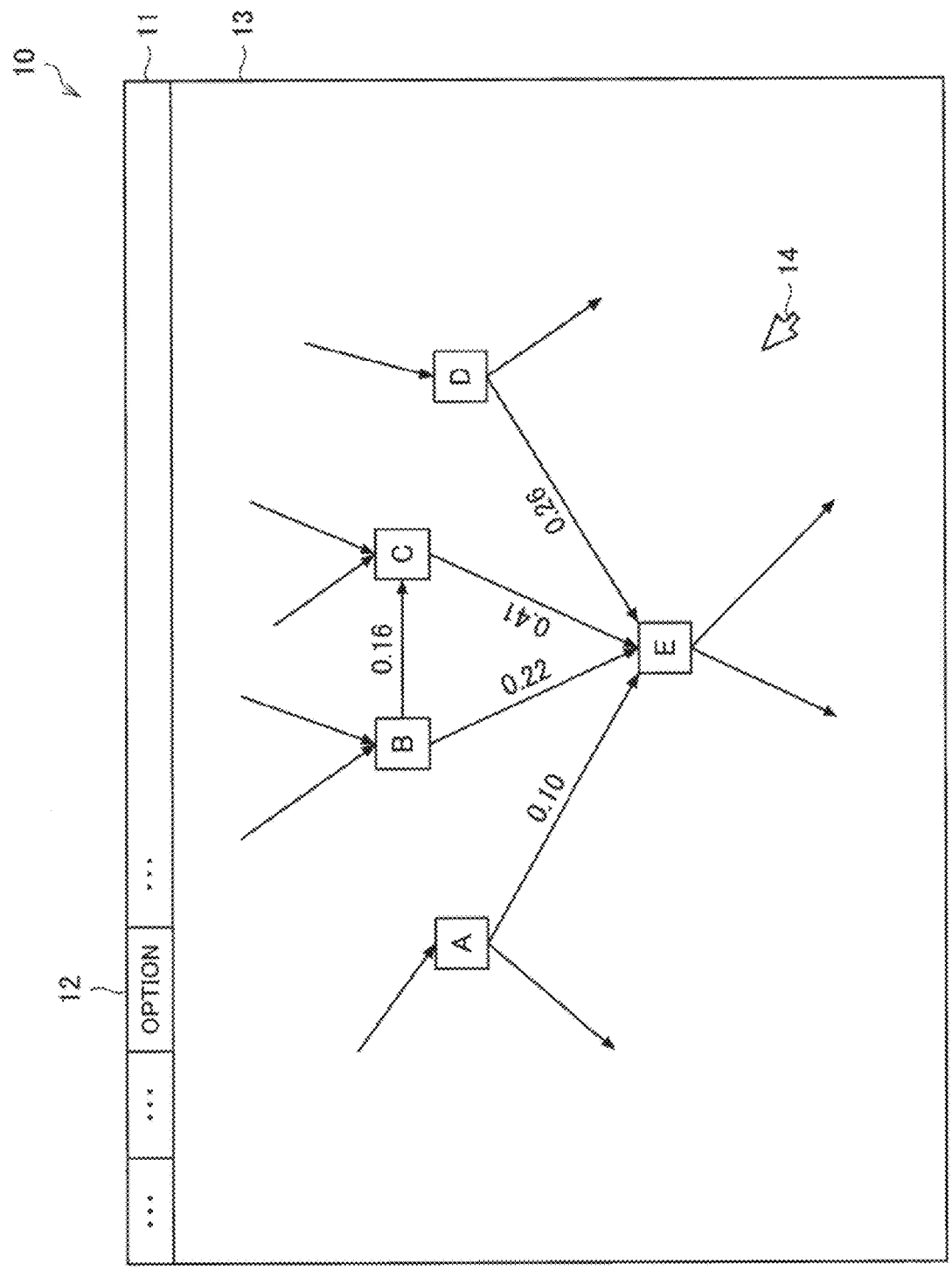
FIG. 2 is a diagram illustrating one example of a UI screen that is output by the information processing apparatus according to the embodiment.

FIG. 2 is a diagram illustrating one example of the UI screen that is output by the information processing apparatus 100 according to the embodiment. The UI screen 10 illustrated in FIG. 2 is an image including a toolbar 11 and a graph area 13. On the toolbar 11, buttons for various operations or settings, such as an option button 12 for displaying a menu including a command for analysis processing, are arranged. A user can operate a pointer 14 with a mouse or the like to perform any operation on the toolbar 11 or the graph area 13. The graph area 13 includes a graph that expresses the correlation or cause-effect relation between two variables detected by the relation detection section 132. The graph is a graph in which variables are expressed as nodes and correlations or cause-effect relations between the variables are expressed as links. When a variable on a front end (that is, an arrowhead on the link indicating the cause-effect relation by an arrow) side of the link is set as a target variable, a variable on a rear end (opposite to the arrowhead on the link indicating the cause-effect relation by the arrow) side of the link is an explanatory variable. The target variable is a variable to be predicted, intervened, or controlled and corresponds to a variable on a result side when the cause-effect relation is indicated. The explanatory variable is a variable that explains the target variable and corresponds to a variable on a cause side when the cause-effect relation is indicated. In the example illustrated in FIG. 2, variables A to E are expressed as the nodes. In describing the relation between the variables A to E, when the variable C is assumed as the target variable, the variable B is the explanatory variable, and when the variable E is assumed as the target variable, the variables A to D are the explanatory variables. As described above, the cause-effect relations between the variables are expressed as the links, so that it becomes possible to easily recognize the presence or absence of the cause-effect relations between the variables. Alternatively, some kinds of correlations between the variables may be expressed as links.

Furthermore, in the graph, it is desirable that an index of the relation between two variables be displayed in association with the link. For example, in the example illustrated in FIG. 2, a correlation coefficient 0.10 between the variables A and E, a correlation coefficient 0.22 between the variables B and E, a correlation coefficient 0.41 between the variables C and E, a correlation coefficient 0.26 between the variables D and E, and a correlation coefficient 0.16 between the variables B and C are displayed in association with the respective links. With this, it becomes possible to easily recognize the strength of the relation between two variables.

Furthermore, the relation detection section 132 outputs information indicating the detected relation between two variables to the relation variable group extraction section 133.

Relation Variable Group Extraction Section 133

The relation variable group extraction section 133 has a function of extracting the combination of explanatory variables including two or more explanatory variables among multiple variables. It is assumed that the number n of explanatory variables included in such a combination is equal to or more than 2. If the explanatory variable is related to a variable designated as a target variable, the relation variable group extraction section 133 extracts, as the combination of explanatory variables, a combination of variables including n variables from the variables detected by the relation detection section 132. The relation variable group extraction section 133 may extract a plurality of combinations of explanatory variables.

The target variable can be designated by a node selection operation in the graph. In such a case, the relation variable group extraction section 133 selects the explanatory variables from variables connected to the target variable by the links or from variables estimated to be a cause of the target variable or variables estimated not to be a result of the target variable among variables connected to the target variable by the links in the graph. For example, on the UI screen 10 illustrated in FIG. 2, when the variable E is selected as the target variable, the relation variable group extraction section 133 selects n explanatory variables from the variables A to D, which are variables connected to the target variable E by the links. The target variable on the UI screen 10 is selected, for example, by moving the pointer 14 over a variable with the mouse and making a left click on the variable.

The explanatory variable may also be designated by a node selection operation in the graph. Assuming that the number of explanatory variables designated by a user is p, the relation variable group extraction section 133 selects n-p explanatory variables from variables connected to the target variable by the links or from variables estimated to be a cause of the target variable or variables estimated not to be a result of the target variable among variables connected to the target variable by the links in the graph. For example, on the UI screen 10 illustrated in FIG. 2, when the variable E is selected as the target variable and the variable A is selected as one of the explanatory variables, the relation variable group extraction section 133 extracts n-1 explanatory variables from the variables B to D. With this, it becomes possible to efficiently analyze a coupling effect related to a specific explanatory variable designated by a user.

The relation variable group extraction section 133 accepts the designation of the number n of explanatory variables included in the combinations of explanatory variables. The number n of explanatory variables can be designated by a user. This point will be described with reference to FIG. 3.

Figure 3:
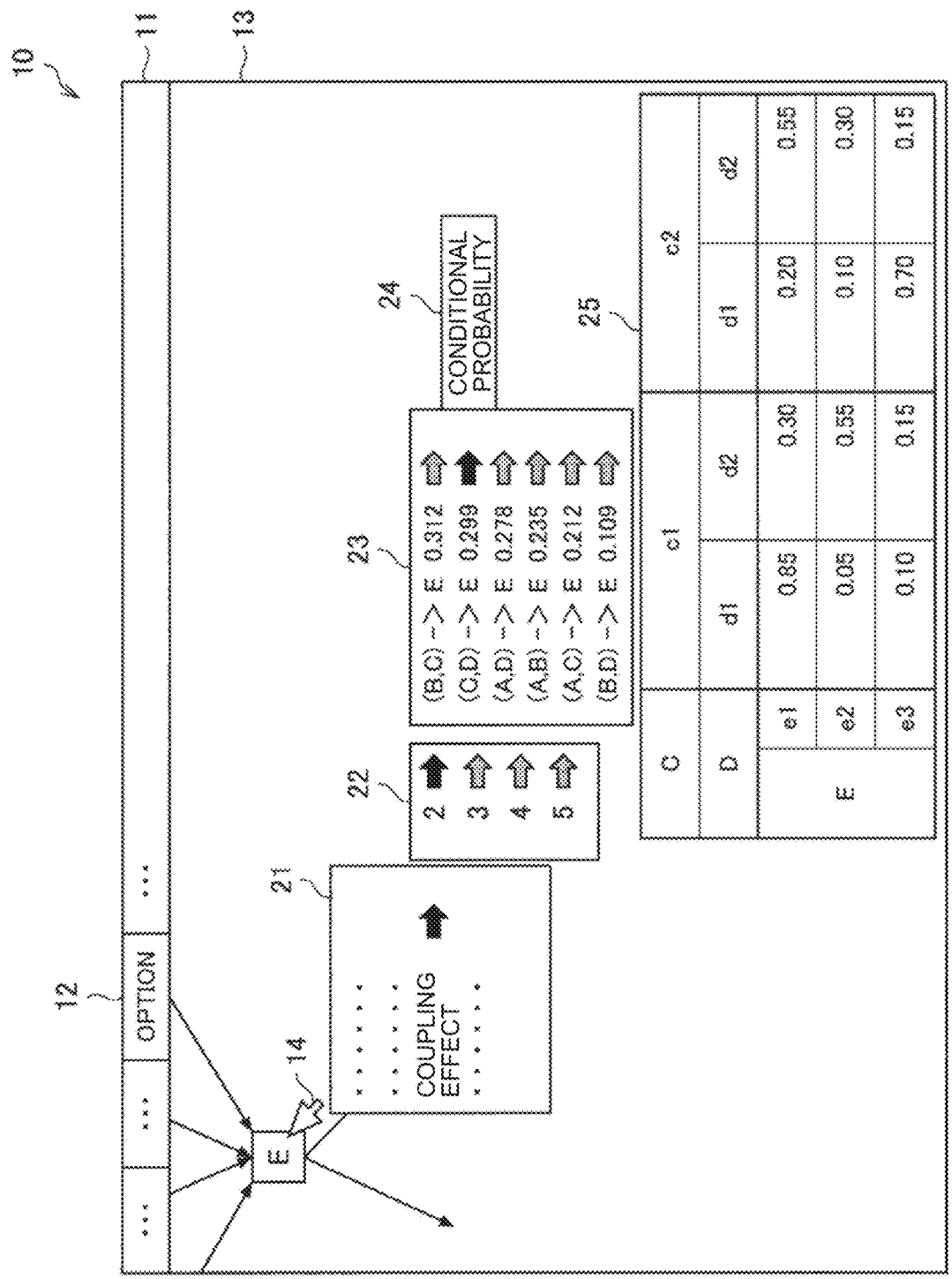
FIG. 3 is a diagram illustrating one example of a UI screen that is output by the information processing apparatus according to the embodiment.

FIG. 3 is a diagram illustrating one example of a UI screen that is output by the information processing apparatus 100 according to the present embodiment. A UI screen 10 illustrated in FIG. 3 is displayed after the variable E is selected as the target variable on the UI screen 10 illustrated in FIG. 2. UI elements 21 to 25 illustrated in FIG. 3 are additionally displayed in sequence according to a user operation. On the UI screen 10 illustrated in FIG. 3, when a right click is made or the option button 12 is selected in the state where the variable E has been selected as the target variable, the menu 21 including a command for analysis processing is displayed. When a "coupling effect" is selected from the menu 21, the sub-menu 22 for accepting the selection of n is displayed. A user can designate n by selecting any number in the sub-menu 22. For example, assuming that 2 is selected as n, a combination of two of the variables A to D is extracted. Note that the other UI elements in FIG. 3 will be described later as appropriate.

The relation variable group extraction section 133 outputs information indicating the extracted combinations of explanatory variables to the coupling effect evaluation section 134.

Coupling Effect Evaluation Section 134

The coupling effect evaluation section 134 has a function of evaluating the relation between the target variable and the combinations of explanatory variables extracted by the relation variable group extraction section 133.

Calculation of First Information

First, the coupling effect evaluation section 134 calculates first information indicating the strength of the relation between the target variable and the combinations of explanatory variables extracted by the relation variable group extraction section 133. The first information is a value indicating the strength of the relation calculated based on entropy, the amount of mutual information, a correlation coefficient, a partial correlation coefficient, a p value of a test, other statistical measures of independence or conditional independence, or a combination thereof. The coupling effect is quantified by such a value. When this value is large, it means that the coupling effect is large, and when this value is small, it means that the coupling effect is small. The first information is also referred to as a first index of the coupling effect below.

A first index J of the coupling effect in the case of three variables can be calculated as expressed by the following Equation.

$$J = H(X|Y) - H(X|Y,Z) \quad (1)$$
$$= I(X;Z|Y),$$

where H is information entropy in information theory and I is the amount of mutual information defined on the basis of the information entropy. X is a target variable and Y and Z are explanatory variables. In Equation (1) above, $H(X|Y)$ is the conditional information entropy of X subjected to Y, and also, $H(X|Y,Z)$ is the conditional information entropy of X subjected to Y and Z.

Furthermore, $I(X;Z|Y)$ is the amount of mutual information of X and Z subjected to Y, and Equation (1) above is equally established (hereinafter, the information entropy is simply referred to as entropy). According to Equation (1) above, the first index J of the coupling effect is an index indicating how much amount of information has increased by the newly added explanatory variable Z, as compared with a correlation value between two variables of the target variable X and the explanatory variable Y. As expressed by Equation (1) above, in the case of three variables, the first index of the coupling effect is the amount of conditional mutual information.

The first index J of the coupling effect in the case of three variables may also be calculated as expressed by the following Equation.

$$J=I(X;Z|Y)-I(X;Z) \quad (2)$$

According to Equation (2) above, the first index J of the coupling effect is a value obtained by subtracting a correlation amount between two variables of the target variable X and the newly added explanatory variable Z from the value expressed in Equation (1) above.

The first index J of the coupling effect in the case of four variables can be calculated as expressed by the following Equation.

$$J=H(X|Y)-H(X|Y,Z,W) \quad (3),$$

where W is an explanatory variable. According to Equation (3) above, the first index J of the coupling effect is an index indicating how much amount of information has increased by the newly added explanatory variables Z and W, as compared with the correlation value between two variables of the target variable X and the explanatory variable Y.

The first index J of the coupling effect in the case of four variables can be calculated as expressed by the following Equation.

$$J=H(X|Y)-H(X|Y,Z,W)-I(X;Z)-I(X;W) \quad (4)$$

According to Equation (4) above, the first index J of the coupling effect is a value obtained by subtracting a correlation amount between two variables of the target variable X and the newly added explanatory variables Z and W from the value expressed in Equation (3) above.

Organizing Combinations of Explanatory Variables Based on First Index J of Coupling Effect The coupling effect evaluation section 134 organizes a plurality of combinations of explanatory variables on the basis of the calculated first index of the coupling effect. The coupling effect evaluation section 134 arranges the combinations of the explanatory variables in order based on the magnitude correlation of the first index of the coupling effect related to the combinations of the explanatory variables, and outputs the arranged combinations. For example, the coupling effect evaluation section 134 outputs a list in which the combinations of the explanatory variables are arranged in descending order or ascending order of the first index of the coupling effect. At this time, the coupling effect evaluation section 134 may output the combinations of the explanatory variables and the first index of the coupling effect related to the combinations in correlation with each other. By outputting such a list, it becomes possible to present the combinations of the explanatory variables to a user from a higher coupling effect. In other words, the combinations of explanatory variables to be analyzed in more detail can be recommended to a user in order. This point will be described with reference to FIG. 3 again.

When 2 is selected as the number n of explanatory variables in the sub-menu 22 of the UI screen 10 illustrated in FIG. 3, the list 23 is displayed. In the list 23, the combinations of the explanatory variables including n explanatory variables when the variable E is the target variable are arranged from top to bottom in descending order of the first index of the coupling effect. For example, a combination of the explanatory variables having the highest coupling effect with respect to the target variable E is a combination of the variables B and C, and a combination of the variables C and D is the second highest. Furthermore, in the list 23, the combinations of the explanatory variables and the first index of the coupling effect of the combinations are displayed in correlation with each other. For example, the first index of the coupling effect of the variables B and C with respect to the variable E is 0.312 and the first index of the coupling effect of the variables C and D with respect to the variable E is 0.299.

The coupling effect evaluation section 134 may output information indicating a predetermined number of combinations of explanatory variables selected based on the first index of the coupling effect, among the combinations of the explanatory variables. Assuming that the predetermined number is m, the coupling effect evaluation section 134 outputs information indicating the combinations of upper m explanatory variables based on the first index of the coupling effect. In the list 23 illustrated in FIG. 3, m is 6 and information indicating the combinations of upper six explanatory variables is included in the list 23. With this, it becomes possible to omit the display of the combinations of explanatory variables having a small first index of the coupling effect. In other words, a limited number of combinations of explanatory variables to be analyzed in more detail can be recommended to a user. The coupling effect evaluation section 134 may also accept the designation of the aforementioned predetermined number m. The designation of m can be preset prior to analysis, for example.

The coupling effect evaluation section 134 may output information indicating the combinations of explanatory variables in which the first index of the coupling effect is equal to or larger than a predetermined threshold value, among the combinations of the explanatory variables. The coupling effect evaluation section 134 may combine the threshold value and the selected number m of the combinations of the explanatory variables. In such a case, when the threshold value is set to Th, the coupling effect evaluation section 134 outputs information indicating the combinations of upper m or less explanatory variables in which the first index of the coupling effect is equal to or larger than the threshold value Th. With this, it becomes possible to omit the display of the combinations of explanatory variables in which the first index of the coupling effect is small. In other words, a limited number of combinations of explanatory variables to be analyzed in more detail can be recommended to a user. The designation of the threshold value Th can be preset prior to analysis, for example.

The coupling effect evaluation section 134 outputs information indicating the evaluation result described above to the detailed evaluation section 135. For example, the coupling effect evaluation section 134 outputs, to the detailed evaluation section 135, the combinations of upper m or less explanatory variables in which the first index of the coupling effect is equal to or larger than the threshold value Th. The coupling effect evaluation section 134 may correlate the combinations of the explanatory variables with the first index of the coupling effect related to the combinations of the explanatory variables, and output the correlated combinations of the explanatory variables in a ranking according to the first index of the coupling effect (for example, in descending order). Alternatively, the coupling effect evaluation section 134 can also define that the coupling effect is larger as the first index of the coupling effect is smaller. In such a case, the coupling effect evaluation section 134 may output, to the detailed evaluation section 135, information indicating the combinations of lower m or less explanatory variables in which the first index of the coupling effect is equal to or smaller than the threshold value Th. In such a case, the coupling effect evaluation section 134 may correlate the combinations of the explanatory variables with the first index of the coupling effect related to the combinations of the explanatory variables, and output the correlated combinations of the explanatory variables in a ranking according to the first index of the coupling effect (for example, in ascending order).

Detailed Evaluation Section 135

The detailed evaluation section 135 has a function of evaluating the coupling effect in more detail.

Specifically, the detailed evaluation section 135 calculates and outputs second information indicating the relation between candidate values of respective explanatory variables included in the combinations of specific explanatory variables among the combinations of the explanatory variables and a candidate value of the target variable. The second information is a conditional probability table, a joint probability table, a cross-tabulation table, a multiple regression equation, or the like. Typically, when the variable takes a discrete value, the conditional probability table, the joint probability table, or the cross-tabulation table is output, and when the variable takes a continuous value, the regression equation is output. A user can understand the coupling effect in more detail by referring to the second information. Hereinafter, the second information is also referred to as a second index of the coupling effect. The detailed evaluation section 135 accepts the designation of the combinations of specific explanatory variables for which the second index of the coupling effect is evaluated. The combinations of the specific explanatory variables can be designated by a user. This point will be described with reference to FIG. 3 again.

In the list 23 of the UI screen 10 illustrated in FIG. 3, when the combination of the variables C and D is selected as a combination of the explanatory variables to be evaluated, the sub-menu 24 is displayed for designating what is to be evaluated as the second index of the coupling effect. In FIG. 3, only a conditional probability is displayed as the sub-menu 24. When a user selects the conditional probability in the sub-menu 24, the table 25, which indicates the conditional probability with the variables C and D as the explanatory variables and the variable E as the target variable, is displayed. According to the table 25, for example, when the variable C is a value of c1 and the variable D is a value of d1, the probability that the variable E will be e1 is 0.85. A user can understand the coupling effect in more detail by referring to the table 25.

Report Generation Section 136

The report generation section 136 has a function of generating a report indicating the analysis result of the aforementioned coupling effect. The report described here is a file in any format such as a portable document format (PDF). In the above, an example in which analysis is performed according to a user instruction on the UI screen has been described; however, the report generation section 136 can generate the report without requiring the user instruction or on the basis of a part of the user instruction. For example, on the basis of only the designation of the target variable and the designation of the number n of explanatory variables, the report generation section 136 can generate the report listing calculation results of the first index and the second index of the coupling effect related to the combinations of the explanatory variables.

The report may include information indicating the detection result by the relation detection section 132. For example, the report includes a graph that expresses the relation between multiple variables.

The report may include information indicating the extraction result by the relation variable group extraction section 133. For example, the report includes information indicating the extraction result of explanatory variables in which a variable designated by a user or any variable is the target variable.

The report may include information indicating the evaluation result by the coupling effect evaluation section 134. For example, the report may include a list in which the first index of the coupling effect related to the combinations of the explanatory variables are correlated with the combinations of upper m or less explanatory variables in which the first index of the coupling effect is equal to or larger than the threshold value Th, and to which the ranking according to the first index of the coupling effect is given. Alternatively, the report may include a list in which the first index of the coupling effect related to the combinations of the explanatory variables are correlated with the combinations of lower m or less explanatory variables in which the first index of the coupling effect is equal to or smaller than the threshold value Th, and to which the ranking according to the first index of the coupling effect is given. The threshold value Th and the number m of selections may also be designated by a user or may also be any values.

The report may include information indicating the evaluation result by the detailed evaluation section 135. For example, the report may include a conditional probability table, a joint probability table, a cross-tabulation table, a multiple regression equation, or the like of the combinations of explanatory variables designated by a user or any specific explanatory variables and the target variable.

Supplement

Note that in the above, the evaluation by the detailed evaluation section 135 has been described as being performed for one combination of explanatory variables; however, the present technology is not limited to such an example. The evaluation by the detailed evaluation section 135 may be performed for a plurality of combinations of explanatory variables. For example, the detailed evaluation section 135 may calculate the second index of the coupling effect for all combinations of explanatory variables. Then, the second index of the coupling effect for all the combinations of the explanatory variables may be output to the UI screen or may be output as the report. In such a case, the coupling effect evaluation section 134 may omit the ranking and selection based on the first index of the coupling effect.

Moreover, in the above, it has been described that one value is designated as n; however, the present technology is not limited to such an example. For example, an upper limit value of n may be designated. In such a case, the coupling effect evaluation section 134 and the detailed evaluation section 135 evaluate all n of 2 or more and the upper limit value or less. Then, the second index of the coupling effect for all the combinations of the explanatory variables in all n of 2 or more and the upper limit value or less may be output to the UI screen or may be output as the report.

<<3. Processing Flow>>

Figure 4:
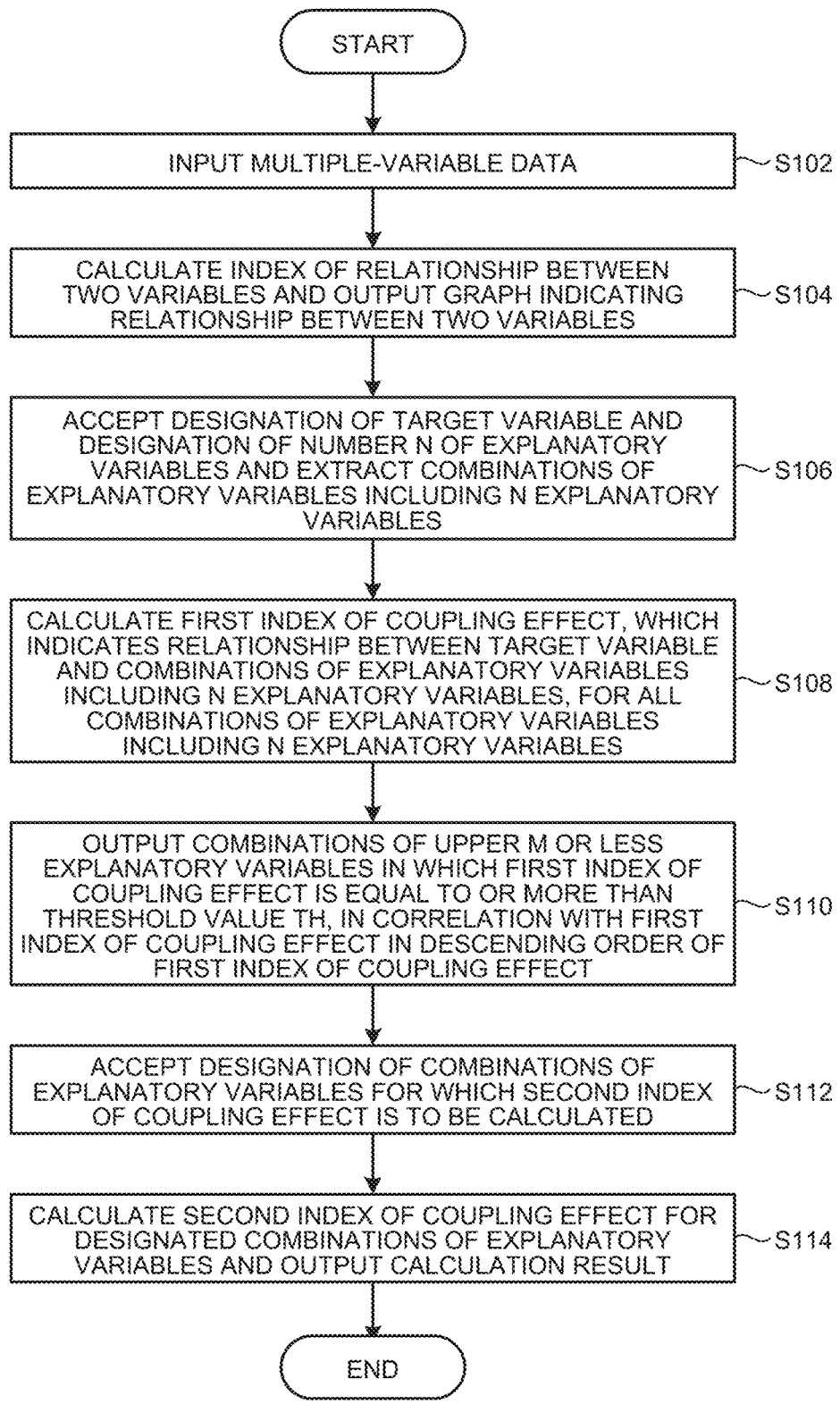
FIG. 4 is a flowchart illustrating one example of the flow of analysis processing of a coupling effect executed in the information processing apparatus according to the embodiment.

FIG. 4 is a flowchart illustrating one example of the flow of the analysis processing of the coupling effect executed in the information processing apparatus 100 according to the present embodiment. As illustrated in FIG. 4, first, the input unit 110 inputs multiple-variable data (step S102). Next, the relation detection section 132 calculates an index of the relation between two variables for all variables of the multiple-variable data and outputs a graph indicating the relation between two variables (step S104). Next, the relation variable group extraction section 133 accepts the designation of the target variable and the designation of the number n of explanatory variables and extracts the combinations of explanatory variables including the n explanatory variables (step S106). Next, the coupling effect evaluation section 134 calculates the first index of the coupling effect, which indicates the relation between the target variable and the combinations of the explanatory variables including the n explanatory variables, for all the combinations of the explanatory variables including the n explanatory variables (step S108). Next, the coupling effect evaluation section 134 outputs the combinations of upper m or less explanatory variables in which the first index of the coupling effect is equal to or larger than the threshold value Th, in correlation with the first index of the coupling effect in descending order of the first index of the coupling effect (step S110). Next, the detailed evaluation section 135 accepts the designation of the combinations of explanatory variables for which the second index of the coupling effect is to be calculated (step S112). Next, the detailed evaluation section 135 calculates the second index of the coupling effect for the designated combinations of the explanatory variables and outputs the calculation result (step S114).

So far, one example of the flow of the analysis processing of the coupling effect has been described. Note that the output of each component may be output as the UI screen. Furthermore, the output of each component may be input to the report generation section 136 and the report generated by the report generation section 136 may be output. Furthermore, in step S110, the coupling effect evaluation section 134 may output the combinations of lower m or less explanatory variables in which the first index of the coupling effect is equal to or smaller than the threshold value Th, in correlation with the first index of the coupling effect in ascending order of the first index of the coupling effect.

<<4. Application Examples>>

Application examples of the proposed technology described above will be described.

(1) First Application Example

The first application example is an example in which the proposed technology is applied to a manufacturing data analysis system.

At a product manufacturing factory, information is acquired by a plurality of measuring instruments and sensors. For example, a measurement value for the shape of a product acquired in a manufacturing process of products, a voltage and a current indicating the state of a processing machine when the processing machine is used, and a serial number and a line number of the processing machine itself are acquired. Furthermore, information such as temperature and humidity of the factory is also acquired. Then, multiple-variable data is generated by associating these pieces of information with information indicating the finish of the product.

By applying correlation analysis and the like to the multiple-variable data, it is possible to examine factors that has an influence on the finish of the product. Moreover, by applying the proposed technology to the multiple-variable data, a list (list of the combinations of explanatory variables arranged based on the first index of the coupling effect), which indicates the combination of factors having a great influence on the finish of the product, is provided. When a problem has occurred in the finish of the product, such a list makes it possible to easily specify a factor having caused the problem.

(2) Second Application Example

The second application example is an example in which the proposed technology is applied to a customer management system.

A company may have a customer management system for the purpose of customer management of various services provided by the company. In such a customer management system, in addition to personal attribute information such as the customer's age, gender, current address, and occupation, information such as which service a user uses, various contract conditions, and the presence or absence of optional subscription, periodical questionnaire information, and the like are managed in association with each customer. The information managed in association with each customer is multiple-variable data.

By applying correlation analysis, cause-effect analysis, and the like to the multiple-variable data, it is possible to examine factors peculiar to a person who does not continue the service. Moreover, by applying the proposed technology to the multiple-variable data, it is possible to easily examine complex factors peculiar to a person who does not continue the service.

(3) Third Application Eexample

The third application example is an example in which the proposed technology is applied to a research and survey support system for diseases.

By a questionnaire survey and the like, it is possible to generate a database in which basic personal attribute information, information on the medical history for various diseases, information on health examination results, and information related to living habits are associated with each individual. Note that the basic personal attribute information includes the gender, age, occupation, family information, and the like. The information on health examination results includes the height, weight, abdominal circumference, blood pressure, and the like. The information related to living habits includes drinking, smoking, sleeping hours, exercise habits, and the like. The information managed in association with each individual is multiple-variable data.

By applying correlation analysis, cause-effect analysis, or the like to the multiple-variable data, it is possible to examine characteristic factors of a person who is prone to a certain disease. Moreover, by applying the proposed technology to the multiple-variable data, an analyzer can easily obtain a report in which the combination of important complex factors is automatically extracted.

<<5. Hardware Configuration Example>>

Figure 5:
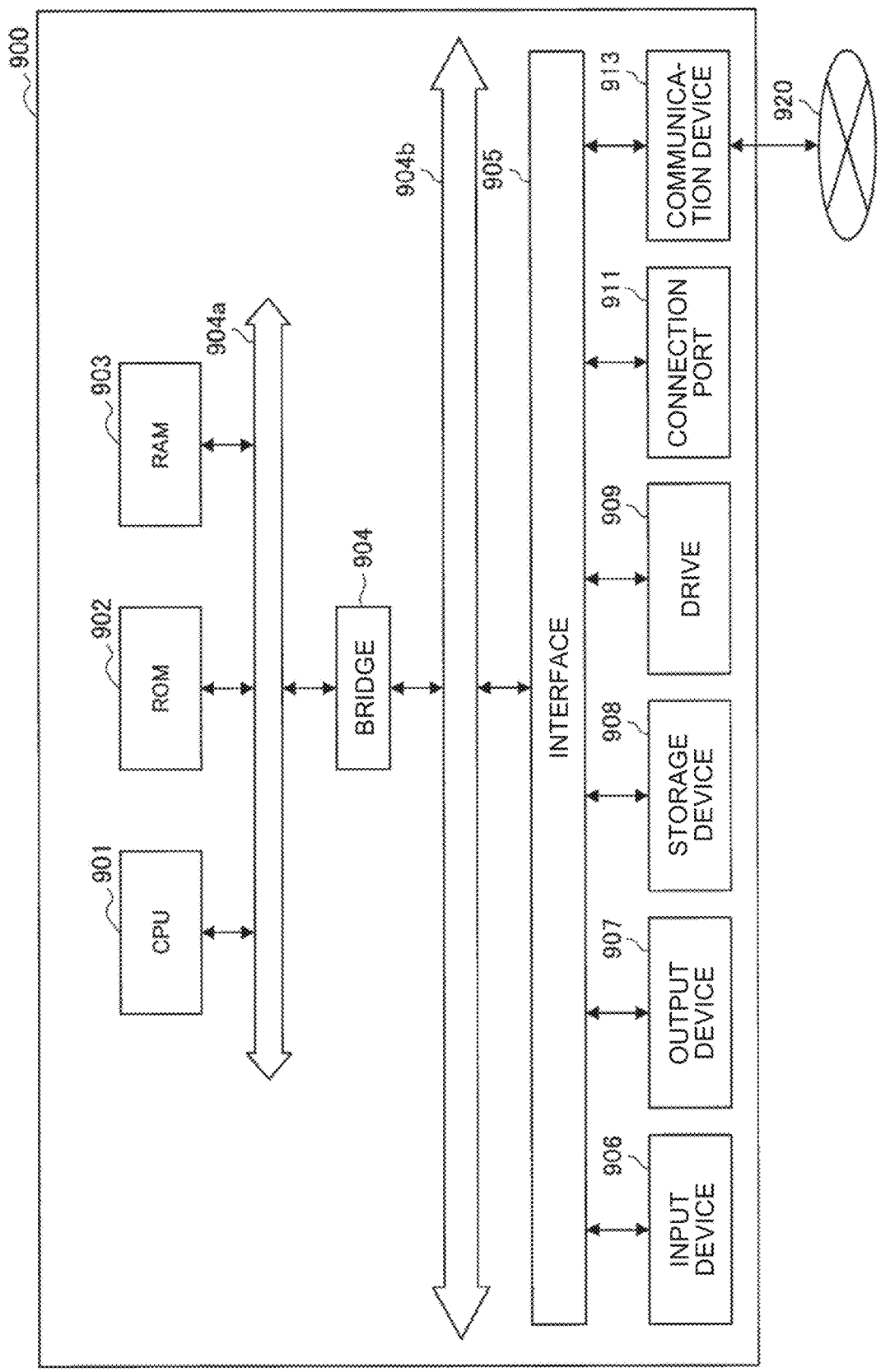
FIG. 5 is a block diagram illustrating one example of a hardware configuration of an information processing apparatus according to the present embodiment.

Finally, a hardware configuration of an information processing apparatus according to the present embodiment will be described with reference to FIG. 5. FIG. 5 is a block diagram illustrating one example of the hardware configuration of the information processing apparatus according to the present embodiment. Note that an information processing apparatus 900 illustrated in FIG. 5 can implement, for example, the information processing apparatus 100 illustrated in FIG. 1. The information processing by the information processing apparatus 100 according to the present embodiment is implemented in cooperation with software and hardware to be described below.

As illustrated in FIG. 5, the information processing apparatus 900 includes a central processing unit (CPU) 901, a read-only memory (ROM) 902, a random-access memory (RAM) 903, and a host bus 904a. Furthermore, the information processing apparatus 900 includes a bridge 904, an external bus 904b, an interface 905, an input device 906, an output device 907, a storage device 908, a drive 909, a connection port 911, and a communication device 913. The information processing apparatus 900 may have a processing circuit such as an electrical circuit, a DSP, or an ASIC, in place of or in combination with the CPU 901.

The CPU 901 serves as an arithmetic processing device or a control device, and controls the overall operations of the information processing apparatus 900 according to various computer programs. Furthermore, the CPU 901 may be a microprocessor. The ROM 902 stores therein computer programs, operation parameters, and the like which are used by the CPU 901. The RAM 903 temporarily stores therein computer programs which are used in the execution of the CPU 901, parameters which are appropriately changed in the execution, and the like. The CPU 901 can form, for example, the control unit 130 illustrated in FIG. 1.

The CPU 901, the ROM 902, and the RAM 903 are connected to each other by the host bus 904a including a CPU bus and the like. The host bus 904a is connected to the external bus 904b, such as a peripheral component interconnect/interface (PCI) bus, via the bridge 904. Note that it is not necessary to separately configure the host bus 904a, the bridge 904, and the external bus 904b, and the functions thereof may be provided to one bus.

The input device 906 is implemented by, for example, a device to which information is input by a user, such as a mouse, a keyboard, a touchscreen, a button, a microphone, a switch, and a lever. Furthermore, the input device 906 may be, for example, a remote control device using infrared rays or other radio waves, or an external connection device such as a mobile phone or a PDA corresponding to the operation of the information processing apparatus 900. Moreover, the input device 906 may include, for example, an input control circuit that generates an input signal on the basis of the information input by the user using the aforementioned input means and outputs the input signal to the CPU 901. By operating the input device 906, the user of the information processing apparatus 900 can input various data to the information processing apparatus 900 or instruct a processing operation. The input device 906 can form, for example, the input unit 110 illustrated in FIG. 1.

The output device 907 is formed by a device capable of visually or audibly notifying the user of the acquired information. Examples of such a device include: a display device such as a CRT display device, a liquid crystal display, a plasma display device, an EL display device, a laser projector, an LED projector, and a lamp; an audio output device such as a speaker and a headphone; and a printer device. The output device 907 outputs, for example, results obtained by various processes performed by the information processing apparatus 900. Specifically, the display device visually displays the results obtained by various processes performed by the information processing apparatus 900, in various forms such as texts, images, tables, and graphs. On the other hand, the audio output device converts an audio signal including reproduced audio data, acoustic data, and the like into an analog signal, and audibly outputs the analog signal. The output device 907 can form, for example, the output unit 120 illustrated in FIG. 1.

The storage device 908 is a device for storing data that is formed as one example of a storage unit of the information processing apparatus 900. The storage device 908 is implemented by, for example, a magnetic storage device such as an HDD, a semiconductor storage device, an optical storage device, or a magneto-optical storage device. The storage device 908 may include a storage medium, a recording device that records data on the storage medium, a reading device that reads the data from the storage medium, a deleting device that deletes the data recorded on the storage medium, and the like. The storage device 908 stores therein the computer programs executed by the CPU 901, various data, various data externally acquired, and the like. The storage device 908 can store therein, for example, the report generated by the control unit 130 and an intermediate result and final result of the analysis process.

The drive 909 is a reader/writer for a storage medium, and is built in or externally attached to the information processing apparatus 900. The drive 909 reads information recorded on a removable storage medium such as a magnetic disk, an optical disc, a magneto-optical disk, or a semiconductor memory that is mounted thereon, and outputs the information to the RAM 903. Furthermore, the drive 909 can also write information to the removable storage medium.

The connection port 911 is an interface connected to an external device, and is a connection port with an external device capable of transmitting data by, for example, a universal serial bus (USB).

The communication device 913 is, for example, a communication interface formed by a communication device for connecting to a network 920. The communication device 913 is, for example, a communication card for a wired or wireless local area network (LAN), long term evolution (LTE), Bluetooth (registered trademark), or wireless USB (WUSB). Furthermore, the communication device 913 may be a router for optical communication, a router for asymmetric digital subscriber line (ADSL), various communication modems, or the like. The communication device 913 can transmit and receive signals and the like to and from, for example, the Internet or other communication devices in accordance with a predetermined protocol such as TCP/IP, for example. In the present embodiment, the communication device 913 serves as the input unit 110 and/or the output unit 120, and may receive information that is input to the control unit 130 and/or transmit information that is output from the control unit 130.

Note that the network 920 is a wired or wireless transmission path for information that is transmitted from a device connected to the network 920. For example, the network 920 may include a public network such as the Internet, a telephone line network, and a satellite communication network, various local area networks (LANs) including Ethernet (registered trademark) and a wide area network (WAN). Furthermore, the network 920 may also include a dedicated line network such as an Internet protocol-virtual private network (IP-VPN).

The above illustrates one example of the hardware configuration capable of implementing the functions of the information processing apparatus 900 according to the present embodiment. The aforementioned each component may be implemented using a general-purpose member, or may be implemented by hardware specialized for the function of each component. Accordingly, it is possible to appropriately change the hardware configuration to be used, according to the technical level at each time the present embodiment is implemented.

Note that it is possible to generate a computer program for implementing each function of the information processing apparatus 900 according to the present embodiment as described above, and to implement the computer program on a PC or the like. Furthermore, it is also possible to provide a computer readable recording medium in which such a computer program is stored. The recording medium is, for example, a magnetic disk, an optical disc, a magneto-optical disk, or a flash memory. Furthermore, the aforementioned computer program may be distributed via a network, for example, without using the recording medium.

<<<6.Summary>>>

So far, one embodiment of the present disclosure has been described in detail with reference to FIG. 1 to FIG. 5. As described above, the information processing apparatus 100 according to the present embodiment accepts the designation of the target variable among multiple variables including three or more variables with respect to data including values of the multiple variables, and outputs the first information indicating the strength of the relation between the target variable and the combinations of explanatory variables including two or more explanatory variables among the multiple variables. The first information that is output is an index of the coupling effect. As described above, the information processing apparatus 100 according to the present embodiment can easily grasp or analyze the coupling effect of multiple variables of three or more variables.

The use case of performing data analysis for understanding the relation between variables by using multiple-variable data is extremely usual and general. In such a use case, it is important to know a correlation or cause-effect relation between important multiple variables including three or more variables. In accordance with the information processing apparatus 100 according to the present embodiment, it has become possible to quantitatively and easily evaluate the relation between the multiple variables of three or more variables, and it has become possible to present the evaluation result to a user in an easy-to-read manner. With this, the efficiency of data analysis is significantly improved and the speed of data understanding by a user is accelerated, so that the effect of speeding up decision making of the user based on the improvement is expected.

So far, the preferred embodiment of the present disclosure has been described in detail with reference to the accompanying drawings; however, the technical range of the present disclosure is not limited to such examples. It is clear that a person having ordinary knowledge in the technical field of the present disclosure can arrive at various changes or modifications within the category of the technical idea recited in the claims, and it is of course understood that these also belong to the technical range of the present disclosure.

Note that each device described in the present specification may be implemented as a single device or a part or the whole thereof may be implemented as separate devices. For example, in the functional configuration example of the information processing apparatus 100 illustrated in FIG. 1, the control unit 130 may also be provided in a device such as a server connected to the input unit 110 and the output unit 120 via a network or the like.

Furthermore, the processes described in the present specification by using the flowchart and the sequence diagram may not always be performed in the illustrated order. Some processing steps may be performed in a parallel manner. Furthermore, an additional processing step may be adopted or some processing steps may be omitted.

Furthermore, the effects described in the present specification are merely explanatory and exemplary, and are not restrictive. That is, the technology according to the present disclosure can obtain other effects that are obvious to a person skilled in the art from the description of the present specification in addition to or in place of the aforementioned effects.

Note that the following configurations also belong to the technical range of the present disclosure.

(1)
An information processing apparatus comprising:
a control unit that accepts a designation of a variable of interest among multiple variables including three or more variables with respect to data including values of the multiple variables, and outputs first information indicating a strength of a relation between the variable of interest and combinations of explanatory variables including two or more explanatory variables among the multiple variables.

(2)
The information processing apparatus according to (1), wherein
the control unit outputs a graph in which variables are expressed as nodes and correlations or cause-effect relations between the variables are expressed as links.

(3)
The information processing apparatus according to (2), wherein
the variable of interest is designated by a node selection operation in the graph.

(4)
The information processing apparatus according to (2) or (4), wherein
the control unit selects the explanatory variables from variables connected to the variable of interest by the links in the graph or from variables estimated to be a cause of the variable of interest or variables estimated not to be a result of the variable of interest among variables connected to the variable of interest by the links in the graph.

(5)
The information processing apparatus according to (2) or (3), wherein
the explanatory variables are designated by a node selection operation in the graph.

(6)
The information processing apparatus according to any one of (1) to (5), wherein
the control unit accepts a designation of the number of the explanatory variables included in the combinations of the explanatory variables.

(7)
The information processing apparatus according to any one of (1) to (6), wherein
the control unit arranges and outputs the combinations of the explanatory variables in order based on a magnitude correlation of the first information related to the combinations of the explanatory variables.

(8)
The information processing apparatus according to (7), wherein
the control unit outputs the combinations of the explanatory variables and the first information related to the combinations in correlation with each other.

(9)
The information processing apparatus according to (7) or (8), wherein
the control unit outputs information indicating a predetermined number of combinations of explanatory variables selected based on the first information, among the combinations of the explanatory variables.

(10)
The information processing apparatus according to (9), wherein
the control unit accepts a designation of the predetermined number.

(11)
The information processing apparatus according to any one of (7) to (10), wherein
the first information is a value indicating a strength of a relation, and
the control unit outputs information indicating combinations of the explanatory variables, in which the first information is equal to or larger than or is equal to or smaller than a predetermined threshold value, among the combinations of the explanatory variables.

(12)
The information processing apparatus according to any one of (1) to (11), wherein
the control unit outputs second information indicating a relation between candidate values of the respective explanatory variables included in combinations of specific explanatory variables among the combinations of the explanatory variables and a candidate value of the variable of interest.

(13)
The information processing apparatus according to (12), wherein
the second information is a conditional probability table, a joint probability table, a cross-tabulation table, or a multiple regression equation.

(14)
The information processing apparatus according to (2) or any one of (3) to (13) depending on (2), wherein
in the graph, third information that is an index of a relation between two variables is displayed in correlation with the links.

(15)
The information processing apparatus according to (14), wherein
the third information is a statistic indicating a correlation or cause-effect relation.

(16)

The information processing apparatus according to any one of (1) to (15), wherein
the first information is a value calculated based on entropy, an amount of mutual information, a correlation coefficient, a partial correlation coefficient, a p value of a test, other statistical measures of independence or conditional independence, or a combination thereof.

(17)

An information processing method performed by a processor, the information processing method comprising:
accepting a designation of a variable of interest among multiple variables including three or more variables with respect to data including values of the multiple variables; and
outputting first information indicating a strength of a relation between the variable of interest and combinations of explanatory variables including two or more explanatory variables among the multiple variables.

(18)

A computer program causing a computer to serve as:
a control unit that accepts a designation of a variable of interest among multiple variables including three or more variables with respect to data including values of the multiple variables, and outputs first information indicating a strength of a relation between the variable of interest and combinations of explanatory variables including two or more explanatory variables among the multiple variables.

REFERENCE SIGNS LIST

100 INFORMATION PROCESSING APPARATUS
110 INPUT UNIT
120 OUTPUT UNIT
130 CONTROL UNIT
131 INPUT/OUTPUT CONTROL SECTION
132 RELATION DETECTION SECTION
133 RELATION VARIABLE GROUP EXTRACTION SECTION
134 COUPLING EFFECT EVALUATION SECTION
135 DETAILED EVALUATION SECTION
136 REPORT GENERATION SECTION

The invention claimed is:

1. An information processing apparatus comprising:
a control unit including processing circuitry configured to accept a selection of a variable of interest among multiple variables including three or more variables with respect to data including values of the multiple variables, and to output first information indicating a strength of a relation between the variable of interest and combinations of explanatory variables including two or more explanatory variables among the multiple variables, wherein the first information controls display on a display screen of a table indicating probabilities that the variable of interest has specified values for different values of a selected combination of explanatory variables and wherein the processing circuitry is configured to:
in response to selection by a user of the variable of interest and a number of explanatory variables to be analyzed, control display on a display screen of a list of combinations of the selected number of explanatory variables and, for each listed combination, a corresponding index of a coupling effect of the combination; and
in response to selection by the user of a combination of the selected number of explanatory variables, control display on the display screen of a table indicating probabilities that the variable of interest has specified values for different values of the selected combination of explanatory variables.

2. The information processing apparatus according to claim 1, wherein
the processing circuitry is configured to output information to control display of a graph in which variables are expressed as nodes and correlations or cause-effect relations between the variables are expressed as links.

3. The information processing apparatus according to claim 2, wherein
the variable of interest is designated by a node selection operation in the graph.

4. The information processing apparatus according to claim 2, wherein
the processing circuitry is configured to select the explanatory variables from variables connected to the variable of interest by the links in the graph or from variables estimated to be a cause of the variable of interest or variables estimated not to be a result of the variable of interest among variables connected to the variable of interest by the links in the graph.

5. The information processing apparatus according to claim 2, wherein
the explanatory variables are designated by a node selection operation in the graph.

6. The information processing apparatus according to claim 1, wherein
the processing circuitry is configured to accept a designation of the number of the explanatory variables included in the combinations of the explanatory variables.

7. The information processing apparatus according to claim 1, wherein
the processing circuitry is configured to arrange and output the combinations of the explanatory variables in order based on a magnitude correlation of the first information related to the combinations of the explanatory variables.

8. The information processing apparatus according to claim 7, wherein
the processing circuitry is configured to output the combinations of the explanatory variables and the first information related to the combinations in correlation with each other.

9. The information processing apparatus according to claim 7, wherein
the processing circuitry is configured to output information indicating a predetermined number of combinations of explanatory variables selected based on the first information, among the combinations of the explanatory variables.

10. The information processing apparatus according to claim 9, wherein
the processing circuitry is configured to accept a designation of the predetermined number.

11. The information processing apparatus according to claim 7, wherein
the first information includes a value indicating a strength of a relation, and
the processing circuitry is configured to output information indicating combinations of the explanatory variables, in which the first information is equal to or larger than or is equal to or smaller than a predetermined threshold value, among the combinations of the explanatory variables.

12. The information processing apparatus according to claim 1, wherein
the processing circuitry is configured to output second information indicating a relation between candidate values of the respective explanatory variables included in combinations of specific explanatory variables among the combinations of the explanatory variables and a candidate value of the variable of interest.

13. The information processing apparatus according to claim 12, wherein
the second information includes a conditional probability table, a joint probability table, a cross-tabulation table, or a multiple regression equation.

14. The information processing apparatus according to claim 2, wherein
in the graph, third information that includes an index of a relation between two variables is displayed in correlation with the links.

15. The information processing apparatus according to claim 14, wherein
the third information includes a statistic indicating a correlation or cause-effect relation.

16. The information processing apparatus according to claim 1, wherein
the first information includes a value calculated based on entropy, an amount of mutual information, a correlation coefficient, a partial correlation coefficient, a p value of a test, other statistical measures of independence or conditional independence, or a combination thereof.

17. An information processing method performed by a processor, the information processing method comprising:
accepting a selection of a variable of interest among multiple variables including three or more variables with respect to data including values of the multiple variables; and
outputting first information indicating a strength of a relation between the variable of interest and combinations of explanatory variables including two or more explanatory variables among the multiple variables, wherein the first information controls display on a display screen of a table indicating probabilities that the variable of interest has specified values for different values of a selected combination of explanatory variables and wherein the method includes:
in response to selection by a user of the variable of interest and a number of explanatory variables to be analyzed, controlling display on a display screen of a list of combinations of the selected number of explanatory variables and, for each listed combination, a corresponding index of a coupling effect of the combination; and
in response to selection by the user of a combination of the selected number of explanatory variables, controlling display on the display screen of a table indicating probabilities that the variable of interest has specified values for different values of the selected combination of explanatory variables.

18. A non-transitory computer readable medium storing instructions that, when executed by processing circuitry, perform an information processing method comprising:
accepting a selection of a variable of interest among multiple variables including three or more variables with respect to data including values of the multiple variables, and
outputting first information indicating a strength of a relation between the variable of interest and combinations of explanatory variables including two or more explanatory variables among the multiple variables, wherein the first information controls display on a display screen of a table indicating probabilities that the variable of interest has specified values for different values of a selected combination of explanatory variables and wherein the method includes:
in response to selection by a user of the variable of interest and a number of explanatory variables to be analyzed, controlling display on a display screen of a list of combinations of the selected number of explanatory variables and, for each listed combination, a corresponding index of a coupling effect of the combination; and
in response to selection by the user of a combination of the selected number of explanatory variables, controlling display on the display screen of a table indicating probabilities that the variable of interest has specified values for different values of the selected combination of explanatory variables.

* * * * *